(12) United States Patent
Livingston

(10) Patent No.: US 9,643,733 B2
(45) Date of Patent: May 9, 2017

(54) FIRE SEAL FOR AN AIRCRAFT

(71) Applicant: The Boeing Company, Chicago, IL (US)

(72) Inventor: Scott M. Livingston, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 373 days.

(21) Appl. No.: 14/306,621

(22) Filed: Jun. 17, 2014

(65) Prior Publication Data

US 2015/0360795 A1    Dec. 17, 2015

(51) Int. Cl.
| | |
|---|---|
| *F16J 15/08* | (2006.01) |
| *B64D 45/00* | (2006.01) |
| *B21D 5/00* | (2006.01) |
| *B21D 35/00* | (2006.01) |
| *F16J 15/06* | (2006.01) |
| *B64C 7/00* | (2006.01) |
| *B64D 27/00* | (2006.01) |

(52) U.S. Cl.
CPC ............... *B64D 45/00* (2013.01); *B21D 5/00* (2013.01); *B21D 35/002* (2013.01); *B64C 7/00* (2013.01); *B64D 27/00* (2013.01); *F16J 15/065* (2013.01); *F16J 15/0887* (2013.01); *B64D 2045/009* (2013.01)

(58) Field of Classification Search
CPC ........ F16J 15/0887; F16J 15/065; F02C 7/25; F02C 7/28; F05D 2240/55; B64D 45/00; B64D 27/00; B64D 2045/009; B64C 7/00; B21D 5/00; B21D 35/002

USPC ......................................... 277/644, 654, 647
See application file for complete search history.

(56) References Cited

U.S. PATENT DOCUMENTS

| | | | | |
|---|---|---|---|---|
| 4,361,335 A | * | 11/1982 | Vinciguerra | ........... B21D 53/18 277/633 |
| 4,658,847 A | | 4/1987 | McCrone | |
| 4,915,397 A | * | 4/1990 | Nicholson | ............ F16J 15/0887 277/645 |
| 5,249,814 A | * | 10/1993 | Halling | ................ F16J 15/0887 228/214 |
| 5,251,917 A | * | 10/1993 | Chee | ...................... B64D 27/00 244/129.1 |
| 5,524,846 A | | 6/1996 | Shine et al. | |

(Continued)

FOREIGN PATENT DOCUMENTS

| | | |
|---|---|---|
| DE | 10 2010 028797 | 11/2011 |
| DE | 10 2013 103093 | 10/2013 |

(Continued)

OTHER PUBLICATIONS

Extended European Search Report, EP 15 17 2522 (2015).

*Primary Examiner* — Justin Rephann
(74) *Attorney, Agent, or Firm* — Walters & Wasylyna LLC

(57) ABSTRACT

A seal including an acute bend having a first end portion and a second end portion, a first engagement extension extending from the first end portion of the acute bend, and a second engagement extension extending from the second end portion of the acute bend, wherein the second engagement extension is at an acute angle relative to the first engagement extension to define a partially enclosed volume between the first engagement extension and the second engagement extension.

20 Claims, 10 Drawing Sheets

(56) References Cited

U.S. PATENT DOCUMENTS

| | | | |
|---|---|---|---|
| 5,910,094 A | 6/1999 | Kraft et al. | |
| 6,294,729 B1* | 9/2001 | Kaplo | H05K 9/0015 |
| | | | 174/371 |
| 6,918,743 B2 | 7/2005 | Gekht et al. | |
| 8,827,642 B2* | 9/2014 | Walunj | F01D 11/006 |
| | | | 277/644 |
| 2004/0239053 A1* | 12/2004 | Rowe | F16J 15/0887 |
| | | | 277/650 |
| 2005/0023770 A1* | 2/2005 | Swensen | F16J 15/061 |
| | | | 277/602 |
| 2008/0224422 A1* | 9/2008 | Halling | F16J 15/022 |
| | | | 277/644 |
| 2012/0200046 A1 | 8/2012 | Green et al. | |
| 2013/0056936 A1 | 3/2013 | Prehn et al. | |
| 2013/0270777 A1 | 10/2013 | Clouse | |
| 2014/0075948 A1* | 3/2014 | Exner | F02C 7/25 |
| | | | 60/726 |
| 2014/0125014 A1 | 5/2014 | Panchal | |
| 2015/0211636 A1* | 7/2015 | Panchal | B64D 45/00 |
| | | | 277/642 |

FOREIGN PATENT DOCUMENTS

| | | |
|---|---|---|
| FR | 2685748 | 7/1993 |
| GB | 1279468 | 6/1972 |

\* cited by examiner

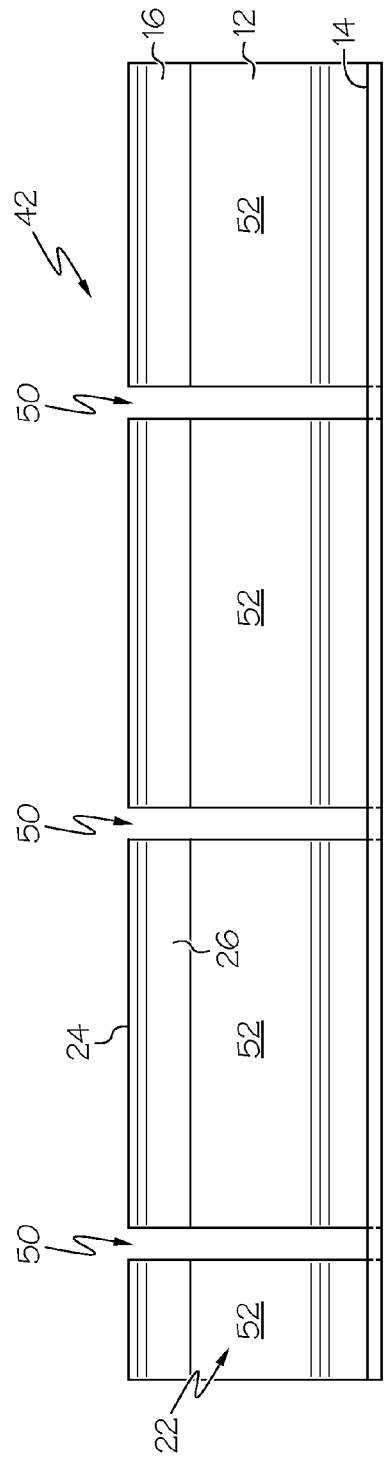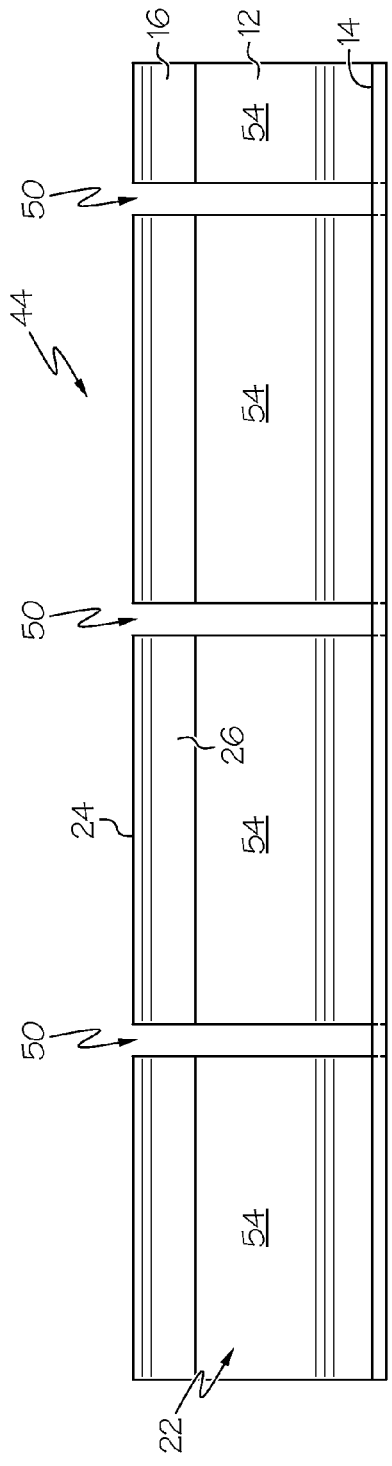
FIG. 4A
FIG. 4B

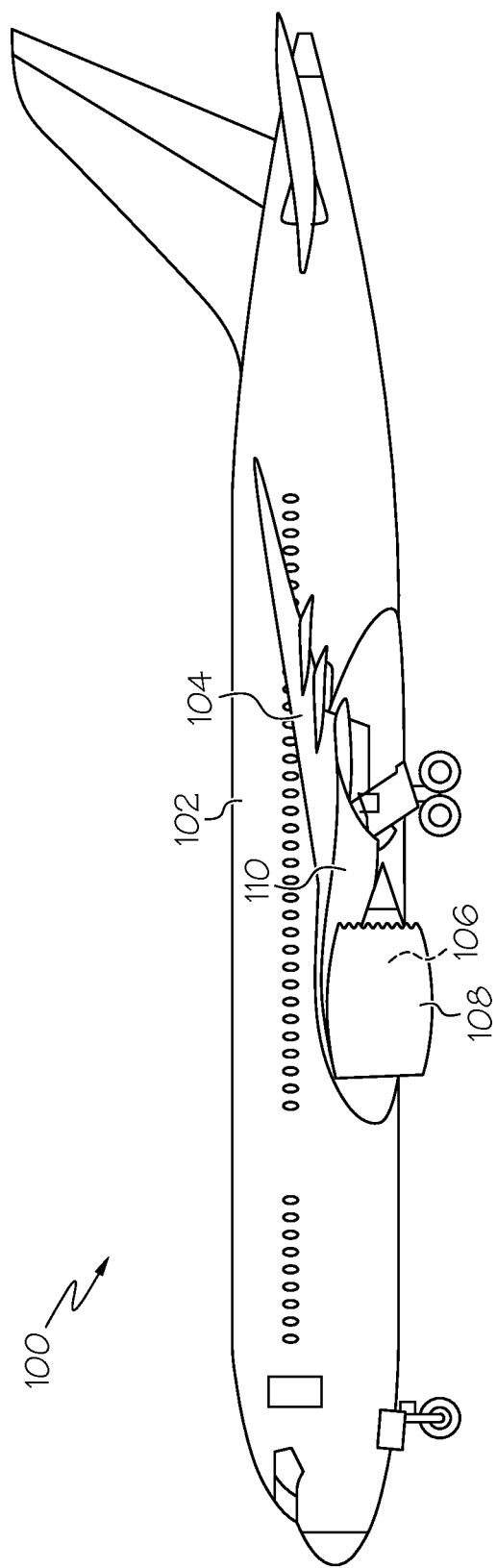

FIRE SEAL FOR AN AIRCRAFT

FIELD

This application relates to seals and, more particularly, to fire seals, such as fire seals for use in a fire zone of an aircraft.

BACKGROUND

Aircraft engines are typically housed in a nacelle. A pylon extends from the nacelle to couple the engine to the aircraft. As one example, the pylon may couple the engine to a wing of the aircraft (e.g., the engine may be suspended below the wing). As another example, the pylon may couple the engine directly to the fuselage of the aircraft (e.g., the engine may be mounted to the side of the fuselage proximate the rear of the fuselage).

In modern aircraft, various steps are typically taken to inhibit the spread of flames from the engine to the wings and fuselage of the aircraft. For example, all structural interfaces within the engine/pylon assembly are typically sealed with fireproof (or fire-resistant) material to eliminate gaps through which flames may propagate.

The structural interfaces of an aircraft vary with manufacturing tolerances and many structural interfaces are dynamic, thereby rendering many structural interfaces of an aircraft difficult to seal. For example, the interface between the pylon fairing and the nozzle of the aircraft engine can be quite dynamic as a result of significant temperature fluctuations. Rubber seals, such as silicone rubber seals, have been used to seal structural interfaces in aircraft, but high operating temperatures limit the use of rubber seals. Metallic feather seals have been used to seal structural interfaces that are too hot for rubber seals. However, metallic feather seals are difficult to install, present durability issues that increase maintenance costs, and typically must be manufactured using relatively high-cost techniques, such as hydroforming.

Accordingly, those skilled in the art continue with research and development efforts in the field of aircraft fire seals.

SUMMARY

In one embodiment, the disclosed fire seal may include an acute bend having a first end portion and a second end portion, a first engagement extension extending from the first end portion of the acute bend, and a second engagement extension extending from the second end portion of the acute bend, wherein the second engagement extension is at an acute angle relative to the first engagement extension to define a partially enclosed volume between the first engagement extension and the second engagement extension.

In another embodiment, the disclosed sealed assembly may include a first member, a second member spaced apart from the first member, and a fire seal positioned between the first member and the second member, the fire seal including an acute bend having a first end portion and a second end portion, a first engagement extension extending from the first end portion of the acute bend, and a second engagement extension extending from the second end portion of the acute bend, wherein the second engagement extension is at an acute angle relative to the first engagement extension to define a partially enclosed volume between the first engagement extension and the second engagement extension.

In another embodiment, the disclosed aircraft may include an engine having a nozzle, a pylon having a pylon fairing, and a fire seal positioned between the nozzle and the pylon fairing, the fire seal including an acute bend having a first end portion and a second end portion, a first engagement extension extending from the first end portion of the acute bend, and a second engagement extension extending from the second end portion of the acute bend, wherein the second engagement extension is at an acute angle relative to the first engagement extension to define a partially enclosed volume between the first engagement extension and the second engagement extension.

In yet another embodiment, the disclosed method for forming a seal may include the steps of (1) providing a sheet of stock material; (2) cutting the sheet to form a silhouette; (3) bending the silhouette in a straight bending machine to form an acute bend having a first engagement extension extending from a first end portion of the acute bend and a second engagement extension extending from a second end portion of the acute bend; and (4) bending the second engagement extension in the straight bending machine to form a bend therein.

Other embodiments of the disclosed fire seal for an aircraft will become apparent from the following detailed description, the accompanying drawings and the appended claims.

BRIEF DESCRIPTION OF THE DRAWINGS

FIGS. 4A and 4B are front elevational views of the inner layer (FIG. 4A) and the outer layer (FIG. 4B) of the layered structure of the fire seal of FIG. 3;

FIG. 5 is a side elevational view of one embodiment of the disclosed aircraft, which incorporates the fire seal of FIG. 1 in a fire zone thereof;

DETAILED DESCRIPTION

Figure 1:
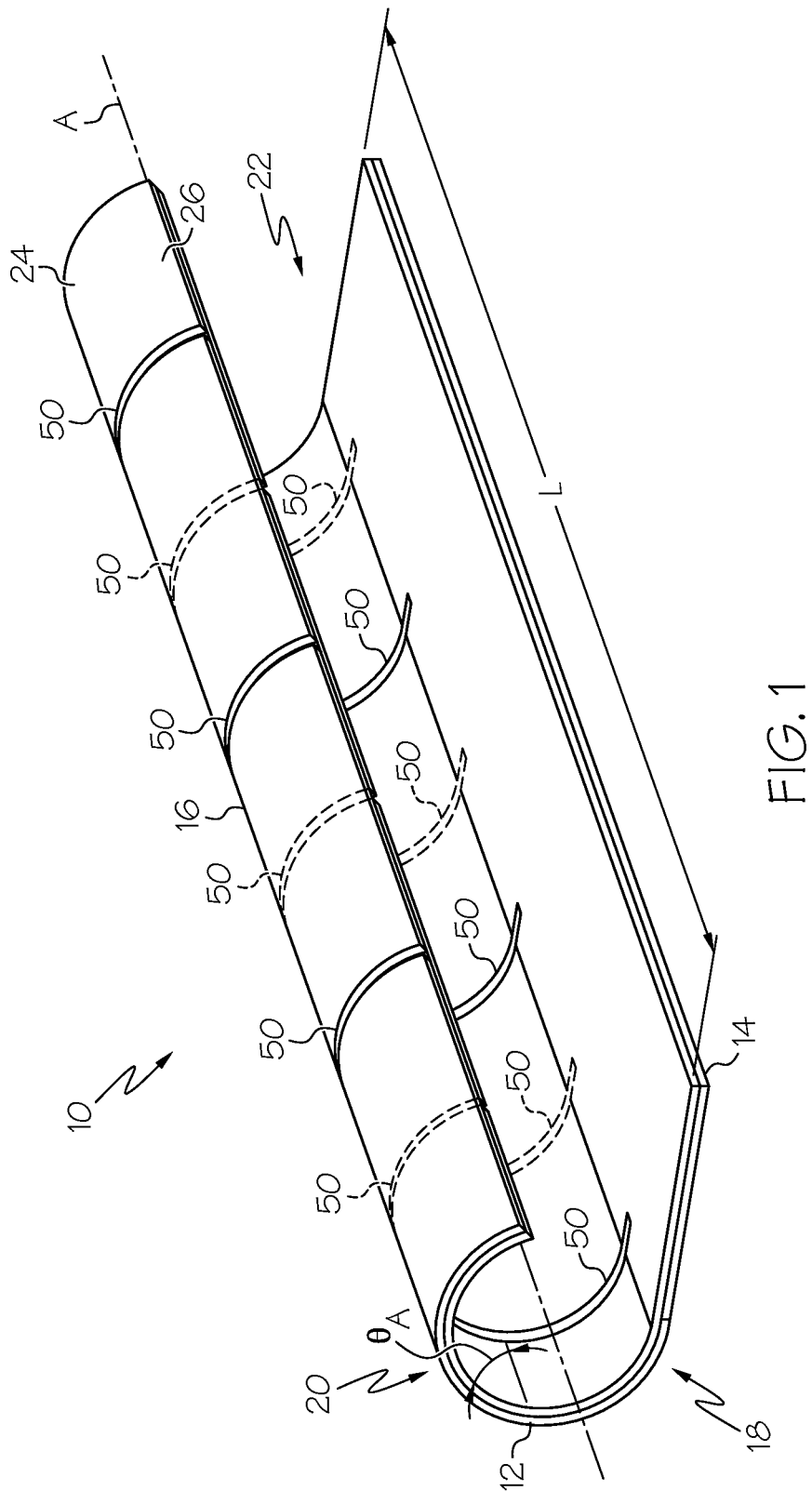
FIG. 1 is a front and side perspective view of one embodiment of the disclosed fire seal.
Figure 2:
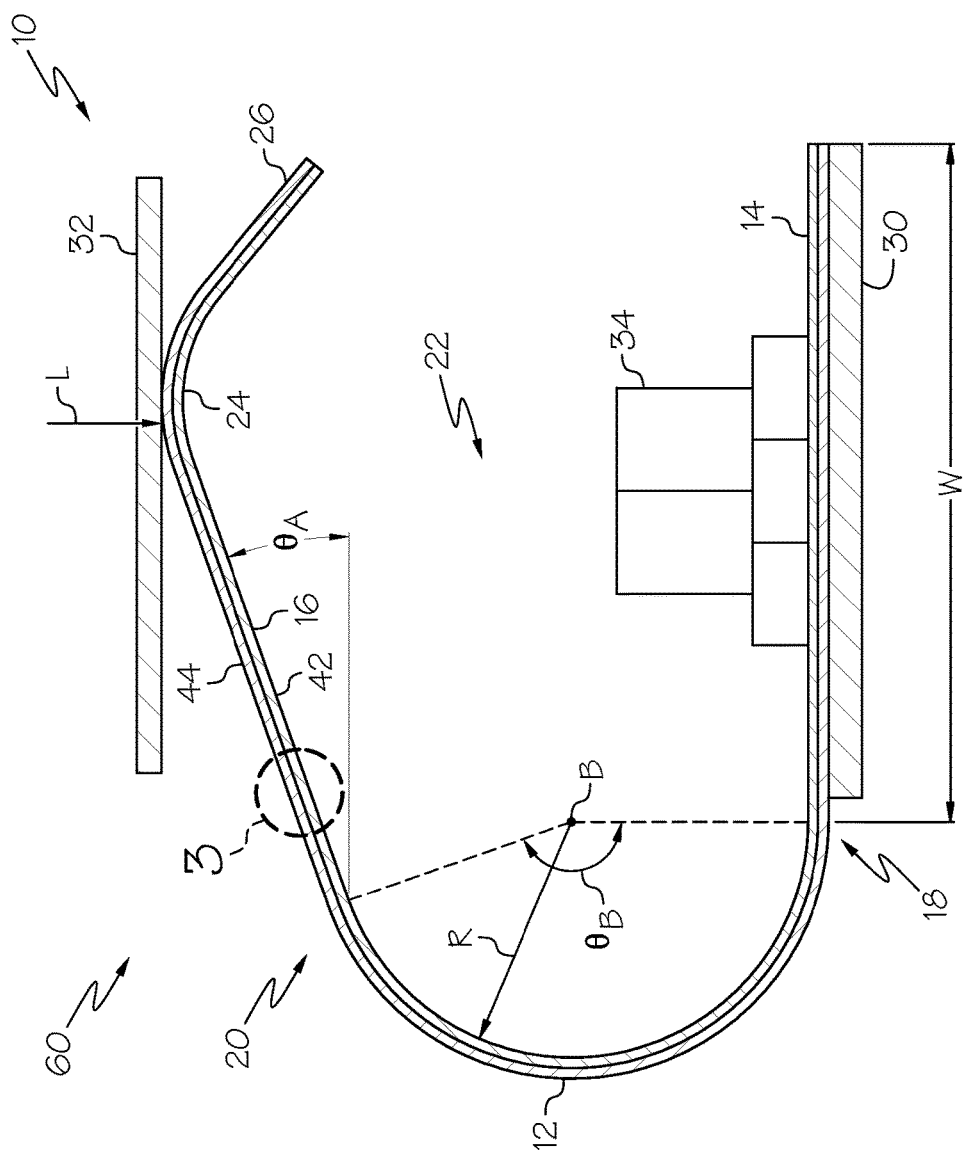
FIG. 2 is a side elevational view, in section, of the fire seal of FIG. 1, but shown positioned between a first member and a second member, with a mechanical fastener securing the fire seal to the first member.

Referring to FIGS. 1 and 2, one embodiment of the disclosed fire seal, generally designated 10, may include an acute bend 12, a first engagement extension 14 and a second engagement extension 16. The fire seal 10 may be elongated along a longitudinal axis A (FIG. 1), which may be substantially straight (as shown) or curved, and may have a longitudinal length L (FIG. 1).

As best shown in FIG. 2, the acute bend 12 of the fire seal 10 may be any physical bend or other redirection or transition between the first engagement extension 14 and the second engagement extension 16 that provides the desired arrangement (acute angle $\Theta_A$) of the first engagement extension 14 relative to the second engagement extension 16. The acute bend 12 may extend more than 90 degrees (bend angle $\Theta_B$) about a bend axis B from a first end portion 18 of the acute bend 12 to a second end portion 20 of the acute bend 12, thereby positioning the second engagement extension 16 at an acute angle $\Theta_A$ relative to the first engagement extension 14.

The magnitude of the bend angle $\Theta_B$ and corresponding acute angle $\Theta_A$ may vary without departing from the scope of the present disclosure. Indeed, selection of the specific bend angle $\Theta_B$ and corresponding acute angle $\Theta_A$ may be a design consideration. As one general, non-limiting example, the bend angle $\Theta_B$ may range from about 100 degrees to about 180 degrees, which may yield an acute angle $\Theta_A$ between the first and second engagement extensions 14, 16 ranging from about 80 degrees to about 0 degrees. As another general, non-limiting example, the bend angle $\Theta_B$ may range from about 135 degrees to about 170 degrees, which may yield an acute angle $\Theta_A$ between the first and second engagement extensions 14, 16 ranging from about 45 degrees to about 10 degrees. As one specific, non-limiting example, the bend angle $\Theta_B$ may be about 160 degrees, which may yield an acute angle $\Theta_A$ between the first and second engagement extensions 14, 16 of about 20 degrees.

Still referring to FIG. 2, the acute bend 12 may have a radius R. Without being limited to any particularly theory, it is presently believed that a relatively larger radius R, which increases the total circumferential length of the acute bend 12, may enhance durability of the fire seal 10 by reducing internal stress (for a given amount of deflection) when the fire seal 10 is under load (see arrow L in FIG. 2).

Thus, in one particular expression, the radius R of the acute bend 12 may depend on the overall size of the fire seal 10, such as the width W of the first engagement extension 14. The width W may be the linear distance the first engagement extension extends from the first end portion 18 (FIG. 2) of the acute bend 12. As one example, the radius R of the acute bend 12 may be at least about 10 percent of the width W of the first engagement extension 14, such as about 10 percent to about 80 percent of the width W of the first engagement extension 14. As another example, the radius R of the acute bend 12 may be at least about 20 percent of the width W of the first engagement extension 14, such as about 20 percent to about 50 percent of the width W of the first engagement extension 14. As yet another example, the radius R of the acute bend 12 may be at least about 30 percent of the width W of the first engagement extension 14, such as about 30 percent to about 40 percent of the width W of the first engagement extension 14.

Referring again to FIGS. 1 and 2, the first engagement extension 14 may extend from proximate (at or near) the first end portion 18 (FIG. 2) of the acute bend 12 and the second engagement extension 16 may extend from proximate the second end portion 20 (FIG. 2) of the acute bend 12. A partially enclosed volume 22 may be defined between the first engagement extension 14 and the second engagement extension 16. Therefore, the fire seal 10 may be generally C-shaped in side view.

Optionally, the second engagement extension 16 may include a bend 24 that directs the distal end 26 of the second engagement extension 16 toward the first engagement extension 14. The bend 24 may be an obtuse bend (shown) or an acute bend (not shown). While only one bend 24 is shown in FIGS. 1 and 2, it is contemplated that the second engagement extension 16 may include multiple bends 24. Furthermore, while the first engagement extension 14 is shown being substantially straight and providing a generally flat surface, it is also contemplated that the first engagement extension 14 may include one or more bends, which may be similar to the bend 24 in the second engagement extension 16.

The first and second engagement extensions 14, 16 may be integral with the acute bend 12 (e.g., formed as a single monolithic body). However, it is also contemplated that one or more of the first engagement extension 14, the second engagement extension 16 and the acute bend 12 may be formed as a separate piece and then connected to the other pieces, such as by welding, press-fitting or with mechanical fasteners.

The fire seal 10 may be formed from various materials without departing from the scope of the present disclosure. Use of metallic materials, polymeric materials and composite materials are contemplated.

In one particular construction, the fire seal 10 may be formed from a metal or metal alloy capable of withstanding aircraft engine fire zone temperatures, such as temperatures ranging from about 500° F. to about 1500° F., while remaining generally springy and resilient. As one general, non-limiting example, the fire seal 10 may be formed from steel. As one specific, non-limiting example, the fire seal 10 may be formed from stainless steel. As another specific, non-limiting example, the fire seal 10 may be formed from a precipitation-hardened stainless steel, such as 17-7 PH® stainless steel available from AK Steel Corporation of West Chester, Ohio.

Optionally, one or more functional coatings or treatments may be applied to a surface of the fire seal 10 (e.g., to the outer surface of the second engagement extension 16). As one example, a wear layer, such as a wear-resistant fabric layer, may be applied to the fire seal 10. As another example, a flame/thermally-resistant spray coating may be applied to the fire seal 10.

Figure 3:
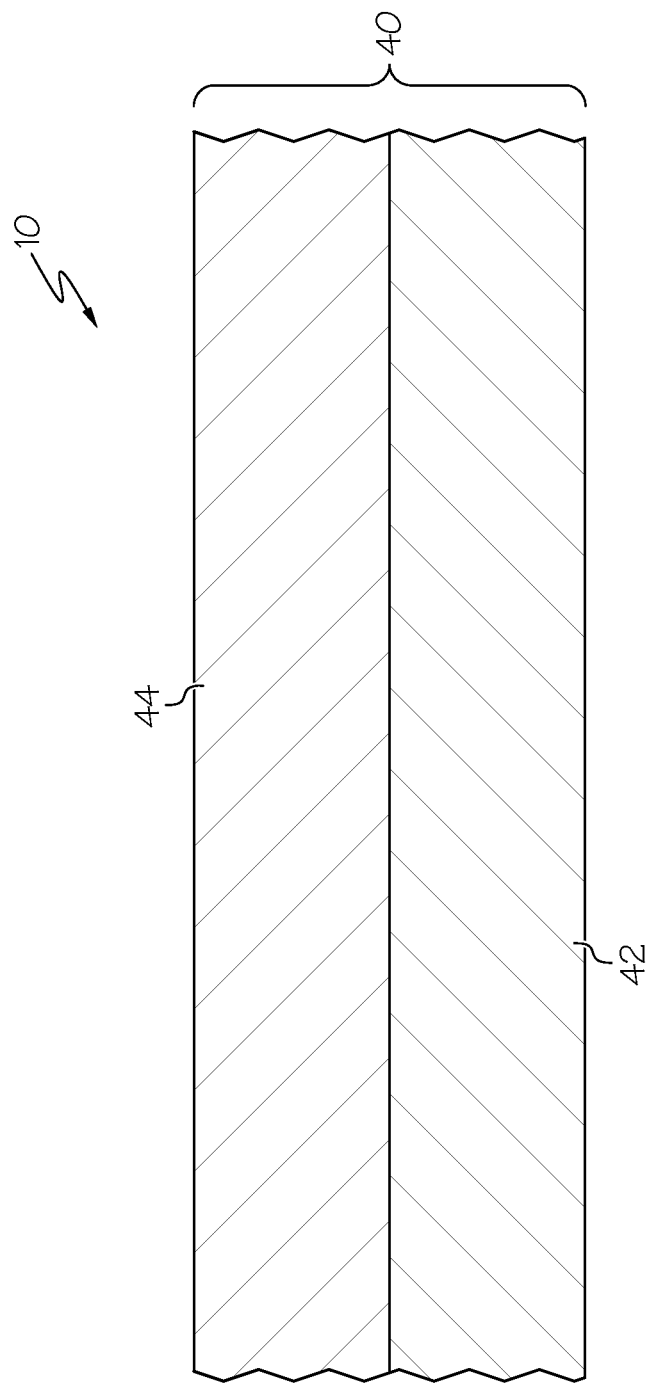
FIG. 3 is a side cross-sectional view of a portion of a layered structure of the fire seal of FIG. 2.

In one particular implementation, the fire seal 10 may be formed as a layered structure 40, as best shown in FIG. 3. The layered structure 40 of the fire seal 10 may include a first, inner layer 42 and a second, outer layer 44. Additional layers may be included in the layered structure 40 of the fire seal 10 without departing from the scope of the present disclosure. Optionally, the layers 42, 44 may be secured together, such as with one or more welds (e.g., spot welds), though securement may be effected at a later time, such as during installation (e.g., with the mechanical fasteners 34 discussed below). The layers 42, 44 of the layered structure 40 may be formed from the same, similar or different materials. For example, both layers 42, 44 may be formed from stainless steel.

Referring now to FIGS. 1, 4A and 4B, each layer 42, 44 of the layered structure 40 (FIG. 3) of the fire seal 10 may include slots 50 formed therein. The slots 50 may extend though the second engagement extension 16 to segment the distal end 26 of the second engagement extension 16. As one example, the slots 50 may only extend through the second engagement extension 16. As another example, the slots 50 may extends from the distal end 26 of the second engagement extension 16 through at least a portion of the acute bend 12. As yet another example, the slots 50 may extend from the distal end 26 of the second engagement extension 16, through the acute bend 12, and into (if not completely through) the first engagement extension 14.

The slots 50 formed in the first layer 42 (FIG. 4A) may divide the first layer 42 into a plurality of first segments 52. The slots 50 formed in the second layer 44 (FIG. 4B) may divide the second layer 44 into a plurality of second segments 54. The number of slots 50 in each layer 42, 44 may be dictated by, for example, the longitudinal length L (FIG. 1) of each layer 42, 44 and the desired longitudinal length of each segment 52, 54.

FIGS. 4A and 4B show the slots 50 formed in the first layer 42 (FIG. 4A) being staggered from the slots 50 formed in the second layer 44 (FIG. 4B). This staggered arrangement may be maintained in the assembled layered structure 40 (FIG. 3) of the fire seal 10, as best shown in FIG. 1. Therefore, the segments 54 (FIG. 4B) of the second layer 44 may cover the slots 50 in the first layer 42, while the segments 52 (FIG. 4A) of the first layer 42 may cover the slots 50 in the second layer 44, thereby reducing (if not eliminating) gaps in the fire seal 10 through which gases may pass and/or flames may propagate. However, since the layers 42, 44 forming the layered structure 40 (FIG. 3) are segmented (e.g., comprise segments 52, 54), the fire seal 10 may more easily conform to a curved undersurface (e.g., the longitudinal axis A of the fire seal 10 may more easily flex and bend from straight to curved).

The fire seal 10 may be formed from a flat sheet of stock material (e.g., stainless steel). The sheet of stock material may be cut (e.g., stamped) to the desired silhouettes (e.g., two flat sheets that will form the two layers 42, 44 (FIG. 3) of the layered structure 40 (FIG. 3)). The silhouettes may be stacked such that the segments 52, 54 (FIGS. 4A and 4B) formed therein are staggered. Any necessary holes, such as for mechanical fasteners 34 (FIG. 2), may be formed (e.g., drilled). Then, the stacked silhouettes may be inserted into a straight bending machine to form the acute bend 12 and the (optional) bend 24 in the second engagement extension 16. At this point, those skilled in the art will appreciate that the manufacturing process does not require more complex (and, thus, more expensive) operations, such as hydroforming.

As shown in FIG. 2, the fire seal 10 may be positioned between a first member 30 and a second member 32 to form a sealed assembly 60. The first engagement extension 14 may be in abutting engagement with the first member 30 and may be physically connected to the first member 30. For example, one or more mechanical fasteners 34, such as nuts/bolts, screws, rivets or the like, may secure the first engagement extension 14 into engagement with the first member 30. The second engagement extension 16 (e.g., the bend 24 of the second engagement extension 16) may extend into abutting engagement with the second member 32, but may not be physically connected to the second member 32. Therefore, the second engagement extension 16 may be free to move relative to the second member 32, such as when the first member 30 moves relative to the second member 32.

Significantly, the fire seal 10 may maintain the seal between the first and second members 30, 32 even as the spacing between the first and second members 30, 32 varies (e.g., increases or decreases). For example, when the second member 32 moves toward the first member 30, thereby reducing the spacing therebetween (e.g., a load L is applied), the fire seal 10 may compress about the acute bend 12 in a spring-like manner. Then, when the second member 32 moves away from the first member 30 (e.g., the load L is reduced or removed), the tension accumulated in the acute bend 12 may cause corresponding expansion that maintains the seal between the first and second members 30, 32.

The disclosed fire seal 10 may be used in various applications. While an aerospace application is described herein, other applications, such as automobile applications, are also contemplated.

Figure 6:
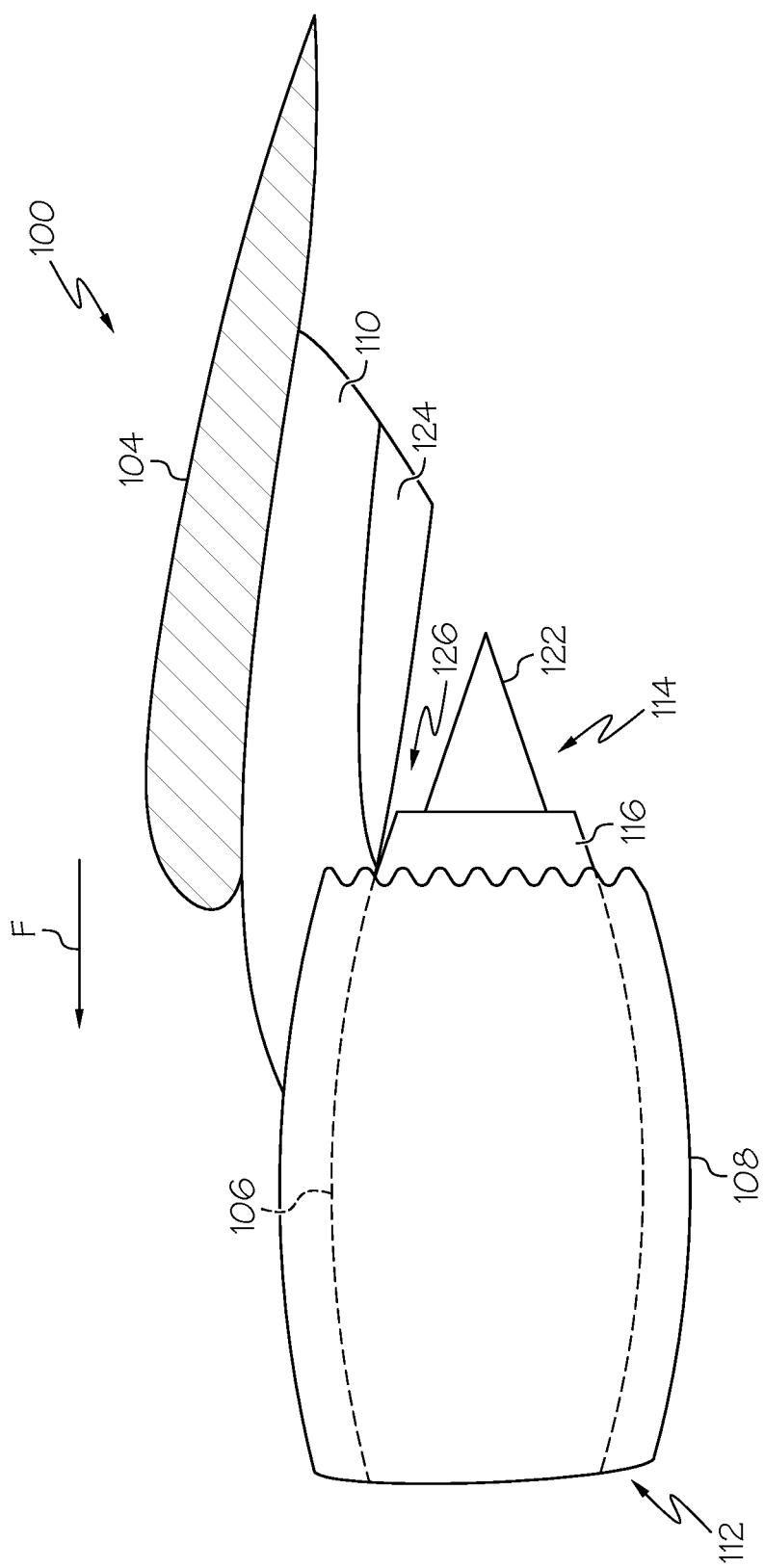
FIG. 6 is a side elevational view of an engine-pylon-wing assembly of the aircraft of FIG. 5.

Referring to FIGS. 5 and 6, one embodiment of the disclosed aircraft, generally designated 100, may include a fuselage 102, a pair of wings 104 (only the port side wing is shown in the drawings) and an engine 106 coupled to each wing 104. The engine 106 may be housed in a nacelle 108. A pylon 110 may couple the engine 106 to the associated wing 104.

Figure 7:
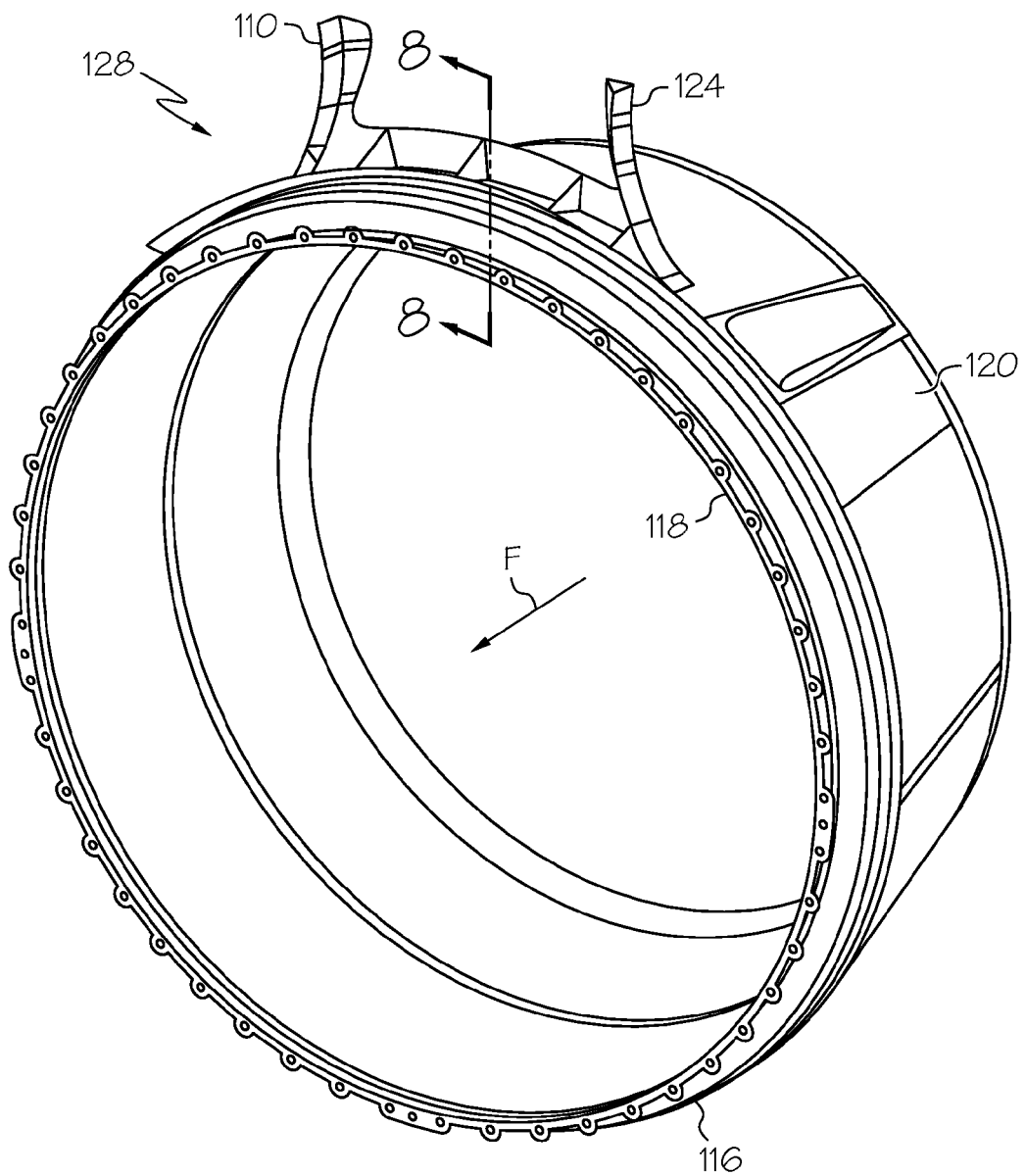
FIG. 7 is a front perspective view of a portion of the engine-pylon-wing assembly of FIG. 6.

As best shown in FIG. 6, the engine 106 may be a gas turbine engine or the like, and may include a forward end 112 and an aft end 114. A nozzle 116 proximate the aft end 114 of the engine 106 may constrict exhaust fluid flow to form a high-pressure jet that propels the aircraft in the forward direction (arrow F). As shown in FIG. 7, the nozzle 116 may include a nozzle body 118 surrounded by a nozzle fairing 120. Referring back to FIG. 6, a plug 122 may optionally be received in the nozzle 116 to control flow of exhaust fluid and/or restrict the exhaust area of the nozzle 116.

Figure 8:
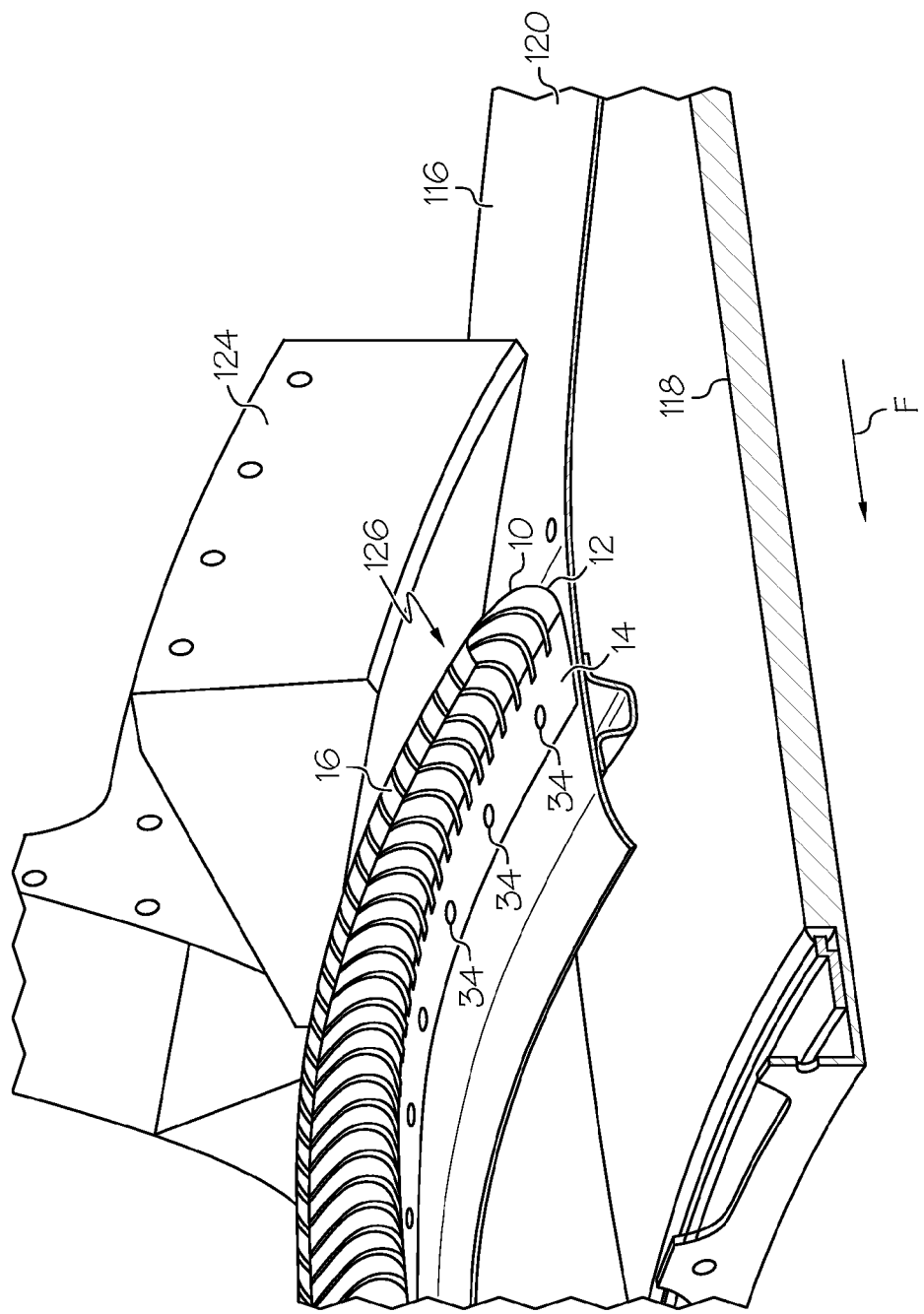
FIG. 8 is a front and side perspective view, in section, of a portion of the engine-pylon-wing assembly of FIG. 7.

Referring to FIGS. 6-8, the interface between the nozzle 116 and the pylon 110 (specifically the pylon fairing 124 of the pylon 110) may define a gap 126 (FIGS. 6 and 8). The gap 126 may be within a fire zone 128. Furthermore, the magnitude of the gap 126 (the gap spacing) may vary, such as with temperature. For example, the gap 126 may shrink as the engine 106 burns hotter.

As shown in FIG. 8, the disclosed fire seal 10 may be positioned in the gap 126. The first engagement extension 14 of the fire seal 10 may be connected to the nozzle 116, such as with mechanical fasteners 34. For example, the first engagement extension 14 may be bolted to the nozzle fairing 120 of the nozzle 116. Once connected, the longitudinal axis A (FIG. 1) of the fire seal 10 may conform to the contour of the nozzle 116.

The second engagement extension 16 of the fire seal 10 may protrude upward into touching engagement with the pylon fairing 124. The spring-like nature of the fire seal 10 may maintain touching engagement with the pylon fairing 124 even as the gap spacing of the gap 126 varies. Therefore, the disclosed fire seal 10 may substantially seal the gap 126 between the nozzle 116 and the pylon fairing 124.

Thus, the nozzle 116 of the aircraft 100 may correspond to the first member 30 shown in FIG. 2, while the pylon fairing 124 of the aircraft 100 may correspond to the second member 32 shown in FIG. 2.

The acute bend 12 of the fire seal 10 may protrude toward the aft end 114 (FIG. 6) of the engine 106 (FIG. 6) such that the fire seal 10 opens in the forward direction (arrow F). By opening in the forward direction (arrow F), the mechanical fasteners 34 securing the fire seal 10 to the nozzle 116 may be significantly more readily accessible to manufacturing and maintenance personnel. Furthermore, by opening in the forward direction (arrow F), airflow during flight (which flows in the direction opposite of arrow F) may fill the partially enclosed volume 22 (FIG. 2) of the fire seal 10, thereby urging the second engagement extension 16 away from the first engagement extension 14 and into engagement with the pylon fairing 124.

Accordingly, the disclosed fire seal 10 may provide a relatively low cost, durable solution for sealing structural interfaces in high temperature environments. The fire seal 10 may be much more flexible and compliant than traditional seals. Therefore, the fire seal 10 may experience less wear and tear, and may be fabricated straight and then assembled onto a curved surface. Manufacturing costs may be reduced by forming the fire seal 10 as one long part, rather than multiple parts.

Figure 9:
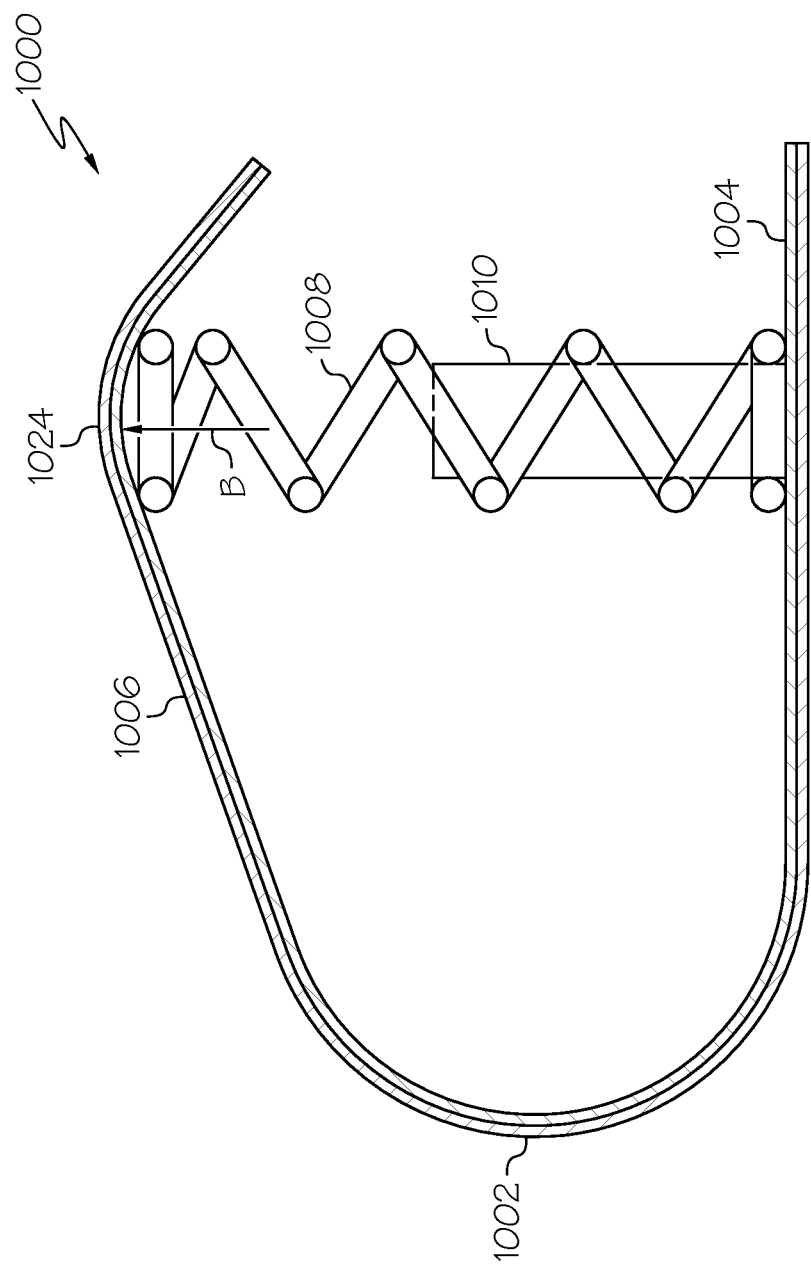
FIG. 9 is a side elevational view, in section, of another embodiment of the disclosed fire seal.

Referring to FIG. 9, another embodiment of the disclosed fire seal, generally designated 1000, may include an acute bend 1002, a first engagement extension 1004, a second engagement extension 1006 and a biasing element 1008.

With the exception of the biasing element 1008, the fire seal 1000 may be constructed in the same or similar manner as the fire seal 10 shown in FIGS. 1 and 2. However, in fire seal 1000, the biasing element 1008 may be positioned between the first engagement extension 1004 and the second engagement extension 1006 to bias the second engagement extension 1006 away from the first engagement extension 1004. For example, the biasing element 1008 may be positioned to apply a biasing force (arrow B) to the second engagement extension 1006 proximate the bend 1024 in the second engagement extension 1006.

In one particular implementation, the biasing element 1008 may be a compression spring, as shown in FIG. 9. For example, the compression spring biasing element 1008 may be closely and coaxially received over a bushing 1010 connected to the first engagement extension 1004. The bushing 1010 may extend across only a portion of the gap between the first engagement extension 1004 and the second engagement extension 1006 to permit movement of the second engagement extension 1006 relative to the first engagement extension 1004.

Figure 10:
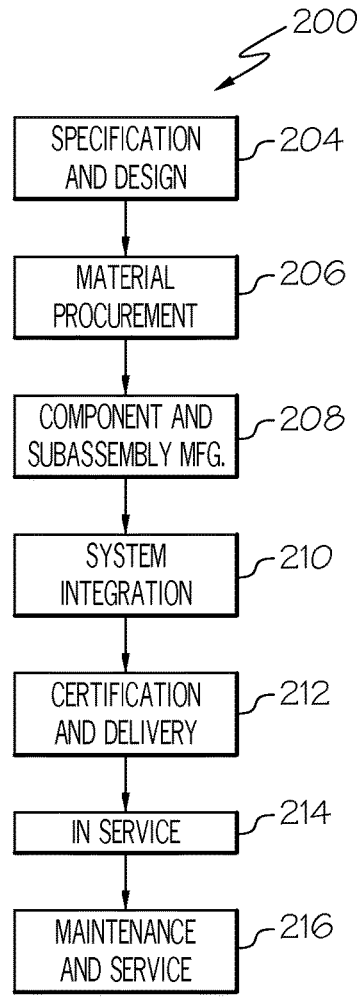
FIG. 10 is flow diagram of an aircraft manufacturing and service methodology.
Figure 11:
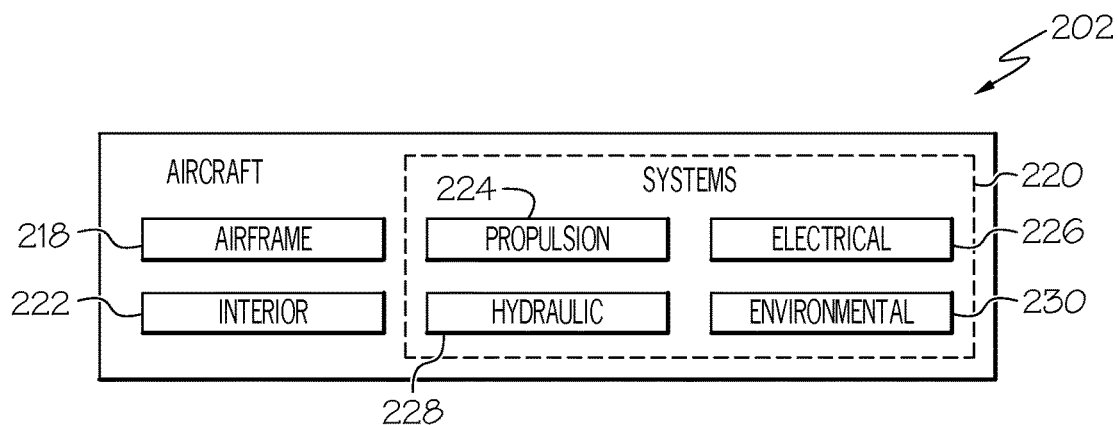
FIG. 11 is a block diagram of an aircraft.

Examples of the disclosure may be described in the context of an aircraft manufacturing and service method 200, as shown in FIG. 10, and an aircraft 202, as shown in FIG. 11. During pre-production, the aircraft manufacturing and service method 200 may include specification and design 204 of the aircraft 202 and material procurement 206. During production, component/subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216, which may also include modification, reconfiguration, refurbishment and the like.

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 11, the aircraft 202 produced by example method 200 may include an airframe 218 with a plurality of systems 220 and an interior 222. Examples of the plurality of systems 220 may include one or more of a propulsion system 224, an electrical system 226, a hydraulic system 228, and an environmental system 230. Any number of other systems may be included.

Apparatus and methods embodied herein may be employed during any one or more of the stages of the aircraft manufacturing and service method 200. For example, components or subassemblies corresponding to component/subassembly manufacturing 208, system integration 210, and or maintenance and service 216 may be fabricated or manufactured using the disclosed fire seal 10 (or fire seal 1000). Also, one or more apparatus examples, method examples, or a combination thereof may be utilized during component/subassembly manufacturing 208 and/or system integration 210, for example, by substantially expediting assembly of or reducing the cost of an aircraft 202, such as the airframe 218. Similarly, one or more of system examples, method examples, or a combination thereof may be utilized while the aircraft 202 is in service, for example and without limitation, to maintenance and service 216.

The disclosed system and method are described in the context of an aircraft; however, one of ordinary skill in the art will readily recognize that the disclosed service system may be utilized for a variety of different components for a variety of different types of vehicles. For example, implementations of the embodiments described herein may be implemented in any type of vehicle including, e.g., helicopters, passenger ships, automobiles and the like.

Although various embodiments of the disclosed fire seal for an aircraft have been shown and described, modifications may occur to those skilled in the art upon reading the specification. The present application includes such modifications and is limited only by the scope of the claims.

What is claimed is:

1. An aircraft comprising:
    an engine having a forward end and an aft end, said engine comprising a nozzle proximate said aft end;
    a pylon fairing spaced apart from said nozzle; and
    a fire seal positioned between said nozzle and said pylon fairing, said fire seal comprising:
        an acute bend comprising a first end portion and a second end portion;
        a first engagement extension extending from said first end portion of said acute bend; and
        a second engagement extension extending from said second end portion of said acute bend, wherein said second engagement extension is at an acute angle relative to said first engagement extension to define a partially enclosed volume between said first engagement extension and said second engagement extension,
        wherein said fire seal is formed as a layered structure comprising a first layer and a second layer, said first layer comprising a plurality of first segments and said second layer comprising a plurality of second segments, said plurality of first segments being staggered from said plurality of second segments, and
        wherein said fire seal is positioned such that said acute bend protrudes toward said aft end of said engine such that said fire seal opens toward said forward end of said engine.

2. The aircraft of claim 1 wherein said first engagement extension is in touching engagement with said nozzle and said second engagement extension is in touching engagement with said pylon fairing.

3. The aircraft of claim 2 wherein said first engagement extension is connected to said nozzle with at least one mechanical fastener.

4. The aircraft of claim 1 wherein said acute angle ranges from about 0 degrees to about 80 degrees.

5. The aircraft of claim 1 wherein said acute angle ranges from about 10 degrees to about 45 degrees.

6. The aircraft of claim 1 wherein said acute bend comprises a radius, wherein said first engagement extension comprises a width, and wherein a magnitude of said radius is at least 10 percent of a magnitude of said width.

7. The aircraft of claim 1 wherein said acute bend comprises a radius, wherein said first engagement extension comprises a width, and wherein a magnitude of said radius is between 20 percent and 50 percent of a magnitude of said width.

8. The aircraft of claim 1 wherein said second engagement extension comprises a distal end and a bend.

9. The aircraft of claim 8 wherein said bend directs said distal end toward said first engagement extension.

10. The aircraft of claim 1 wherein said first engagement extension is substantially straight.

11. The aircraft of claim 1 wherein said first engagement extension, said second engagement extension and said acute bend are formed as a monolithic body.

12. The aircraft of claim 1 wherein each layer of said layered structure is formed as a monolithic body.

13. The aircraft of claim 1 wherein said first engagement extension, said second engagement extension and said acute bend are formed from a metallic material.

14. The aircraft of claim 13 wherein said metallic material comprises steel.

15. The aircraft of claim 1 wherein said plurality of first segments and said plurality of second segments are defined by slots.

16. The aircraft of claim 15 wherein said slots extend from said second engagement extension into said acute bend.

17. The aircraft of claim 1 further comprising a biasing element positioned to bias said second engagement extension away from said first engagement extension.

18. The aircraft of claim 17 wherein said biasing element comprises a compression spring.

19. The aircraft of claim 17 wherein said biasing element is connected to said first engagement extension.

20. The aircraft of claim 1 wherein said first layer of said layered structure is fixedly connected to said second layer of said layered structure.

* * * * *